(12) United States Patent
Inoue

(10) Patent No.: US 6,305,229 B1
(45) Date of Patent: Oct. 23, 2001

(54) DETECTING FATIGUE FROM MAGNETIC CHARACTERISTICS

(75) Inventor: Kiyoshi Inoue, Tokyo (JP)

(73) Assignee: Tanaka Systems Incorporated, Mountain View, CA (US)

( * ) Notice: Subject to any disclaimer, the term of this patent is extended or adjusted under 35 U.S.C. 154(b) by 0 days.

(21) Appl. No.: 09/308,721

(22) PCT Filed: Dec. 23, 1997

(86) PCT No.: PCT/US97/23914

§ 371 Date: May 18, 1999

§ 102(e) Date: May 18, 1999

(87) PCT Pub. No.: WO98/28590

PCT Pub. Date: Jul. 2, 1998

(51) Int. Cl.[7] ................................................ G01B 7/16
(52) U.S. Cl. .................................. 73/779; 324/209
(58) Field of Search ........................ 73/779, 803, 810, 73/811; 324/209

(56) References Cited

U.S. PATENT DOCUMENTS

| | | | |
|---|---|---|---|
| 4,185,279 | * 1/1980 | Bachman | 340/671 |
| 4,677,370 | * 6/1987 | Tustaniwskyj et al. | 324/522 |
| 4,689,558 | 8/1987 | Ruuskanen et al. | 324/209 |
| 4,786,870 | * 11/1988 | Kawamata et al. | 324/207.21 |
| 4,792,755 | * 12/1988 | Huschelrath et al. | 324/225 |
| 4,931,729 | 6/1990 | Pratt | 324/209 |
| 4,931,730 | 6/1990 | Olsen et al. | 324/209 |
| 5,419,201 | 5/1995 | Li et al. | 73/808 |
| 5,423,223 | 6/1995 | Weinstock | 73/810 |
| 5,493,511 | * 2/1996 | Wincheski et al. | 702/39 |
| 5,640,088 | 6/1997 | Sasahara et al. | 324/209 |
| 5,698,977 | 12/1997 | Simpson et al. | 324/209 |

\* cited by examiner

*Primary Examiner*—Max Noori
(74) *Attorney, Agent, or Firm*—D. E. Schreiber

(57) ABSTRACT

Fatigue in a magnetically sensitive detector element (20, 172) can be evaluated using the expression H∞ log(N). Employing this method, measuring changes in magnetization of the detector element (20, 172) permit predicting fatigue with many practical applications.

13 Claims, 7 Drawing Sheets

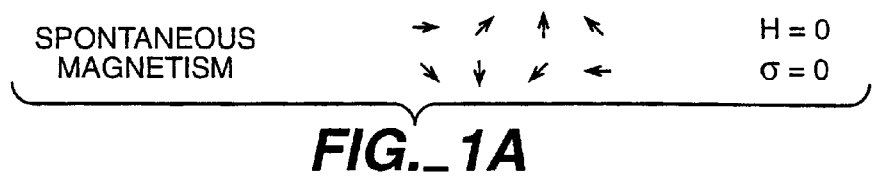
FIG._1A
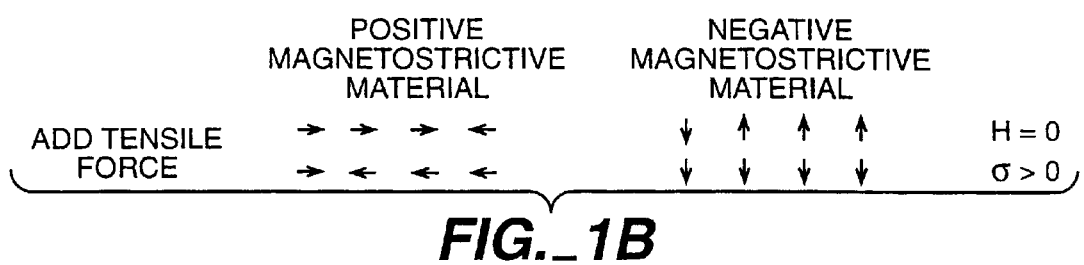
FIG._1B
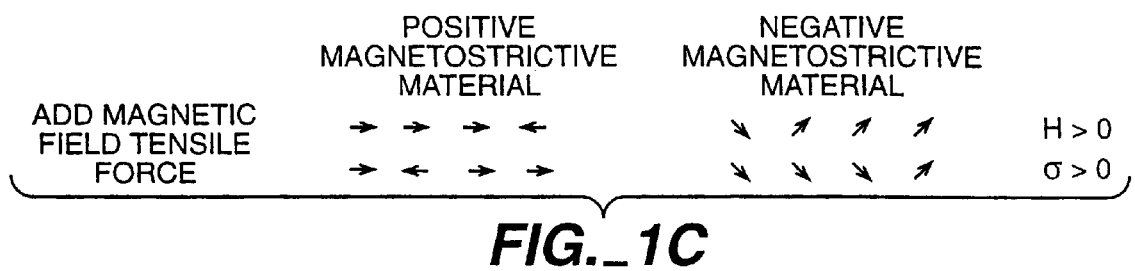
FIG._1C
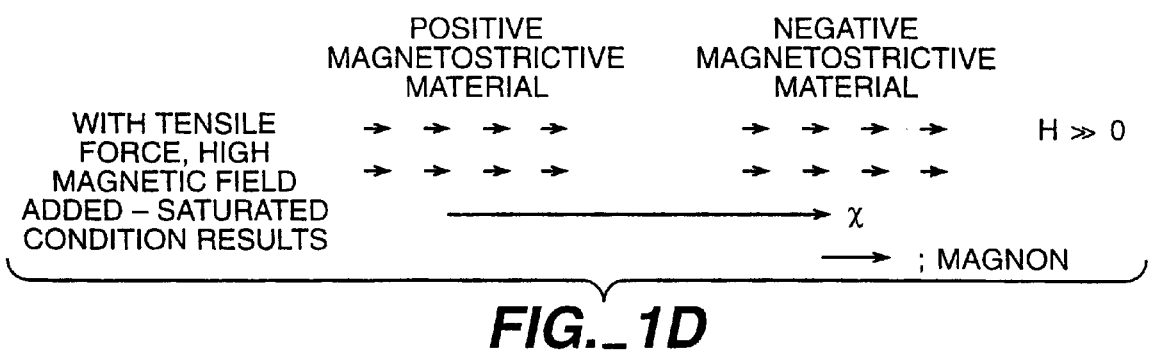
FIG._1D

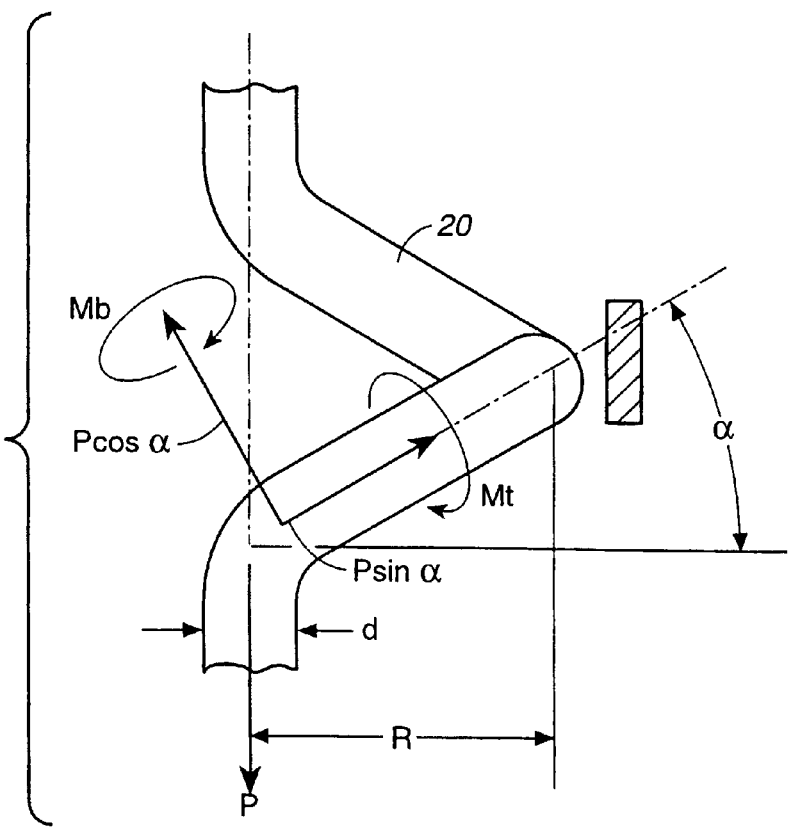
FIG._2
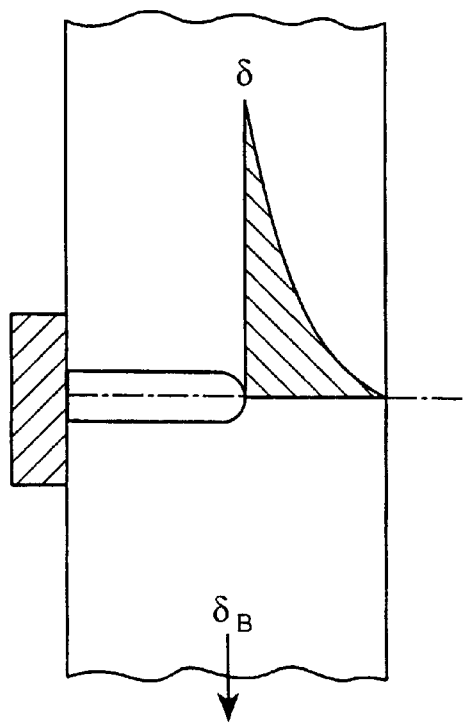
FIG._3

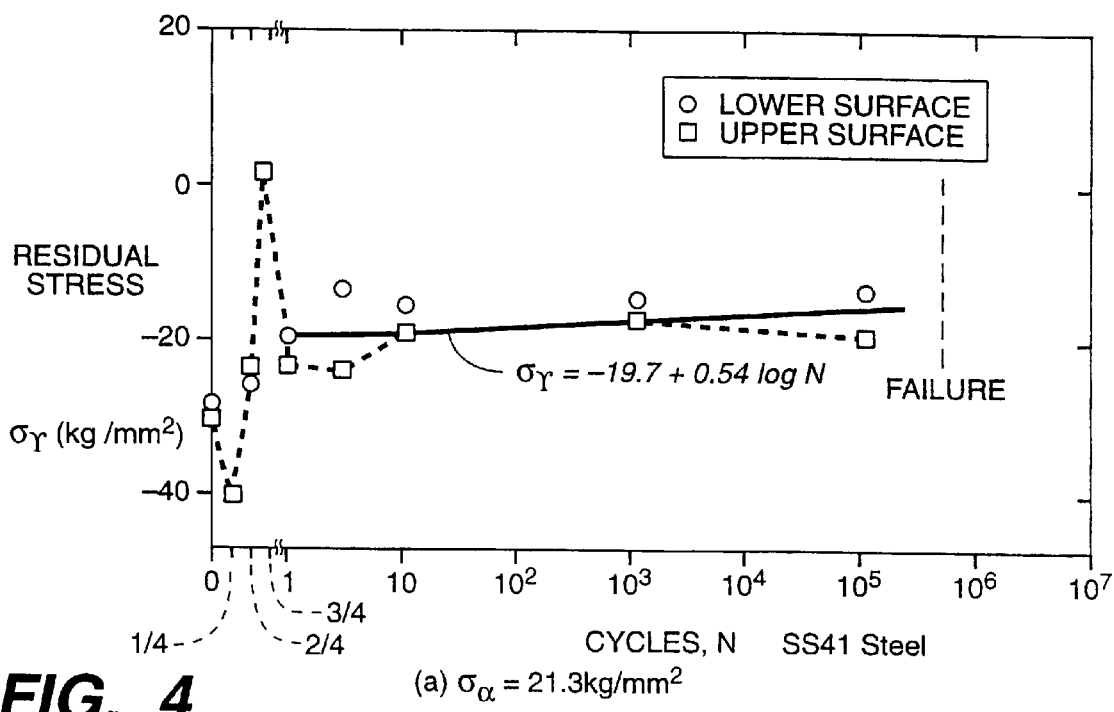
FIG._4
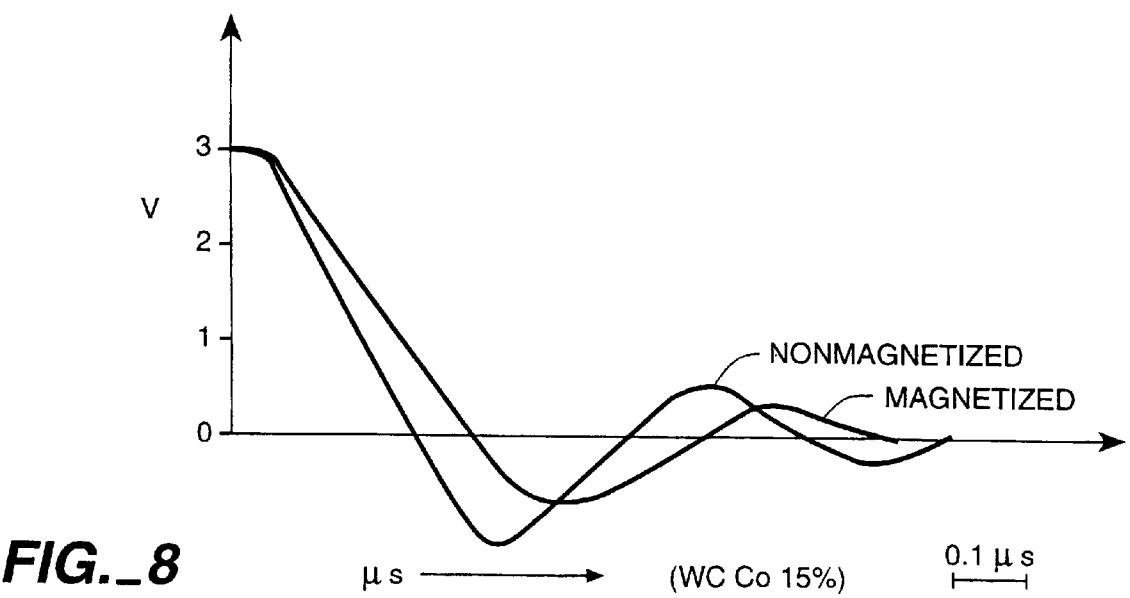
FIG._8

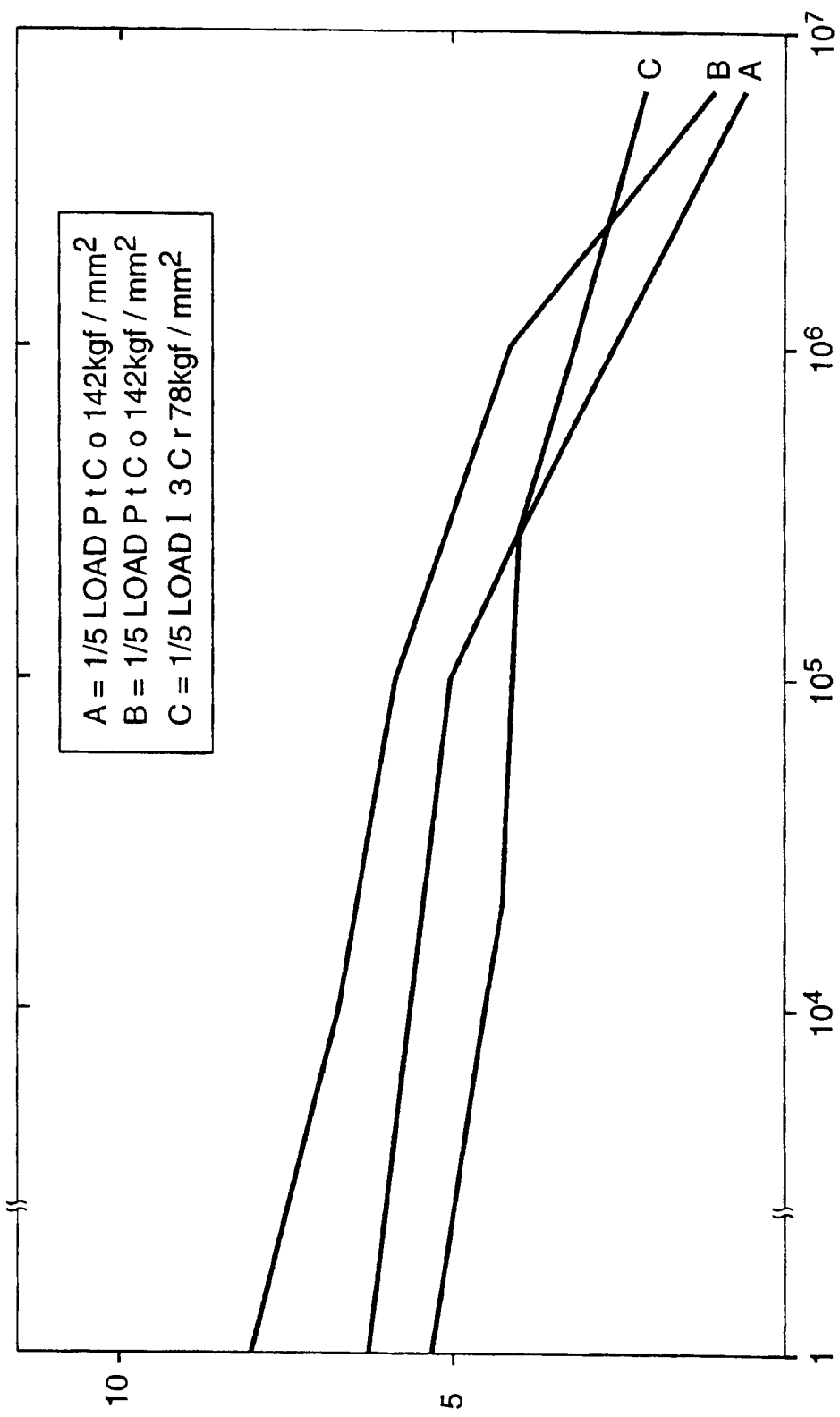
FIG._5

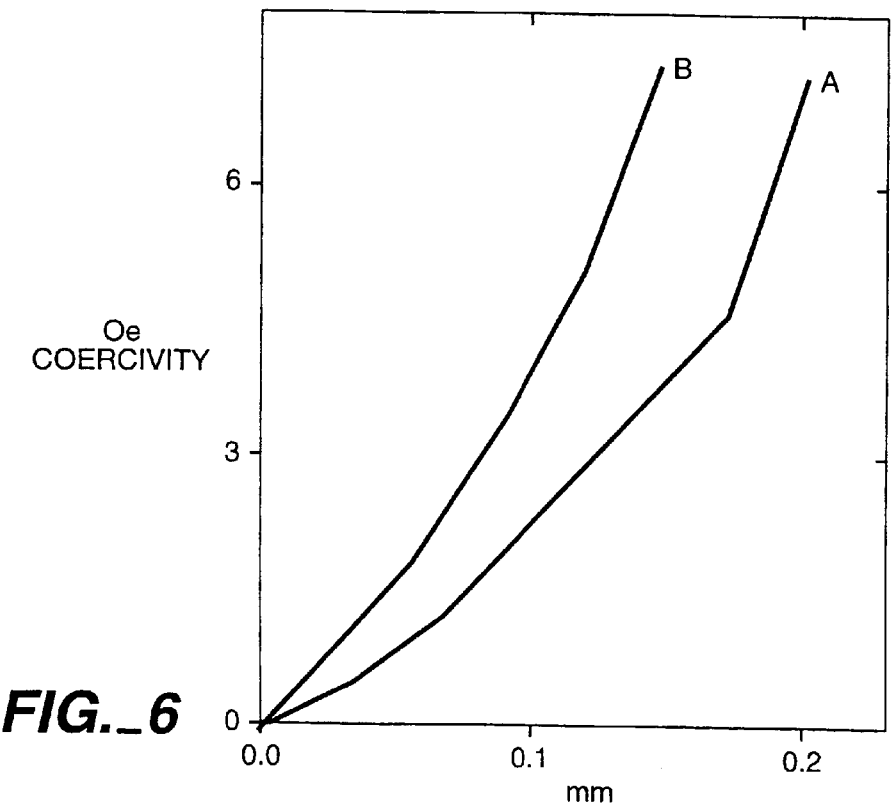
FIG._6
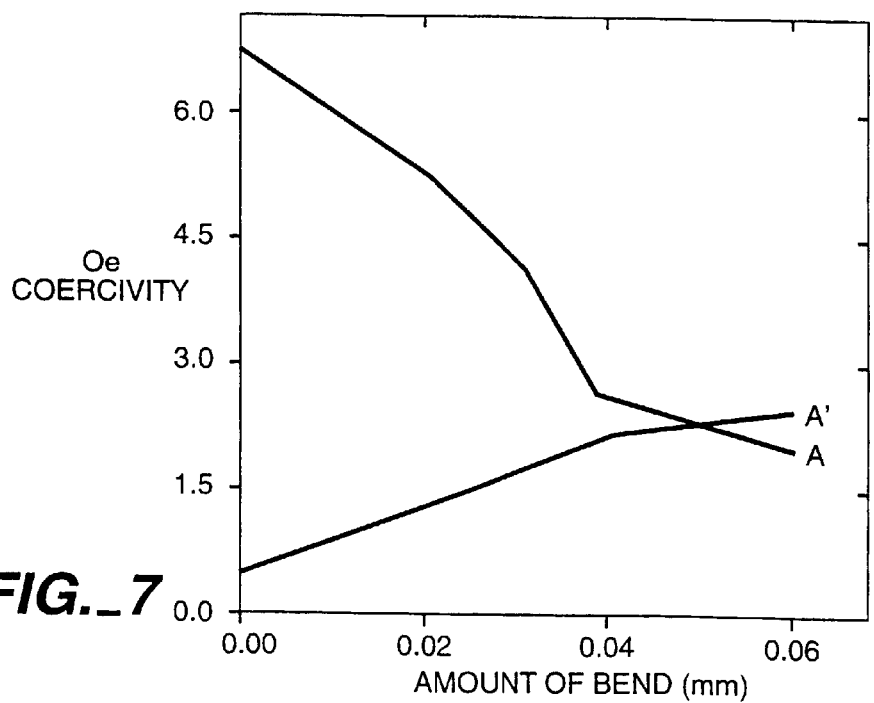
FIG._7

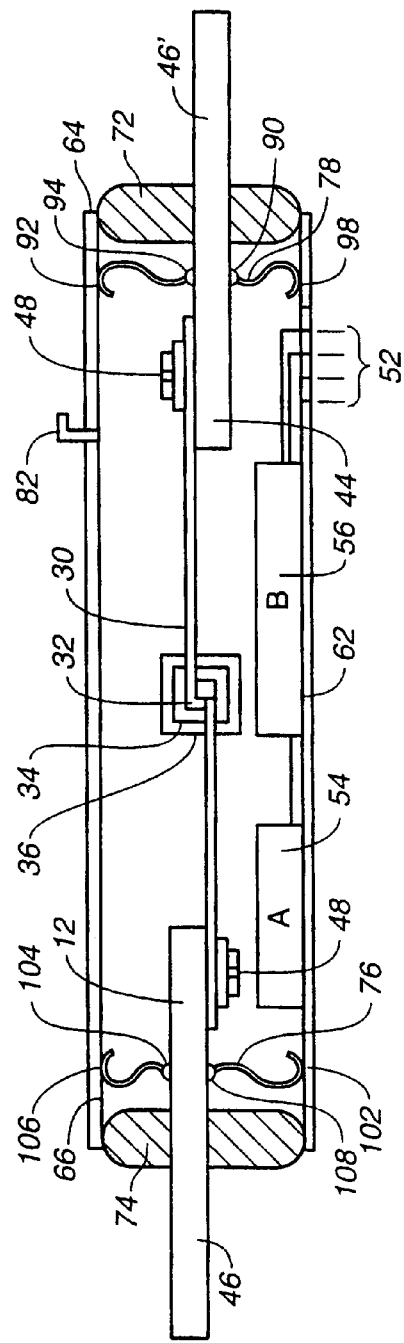
FIG._9
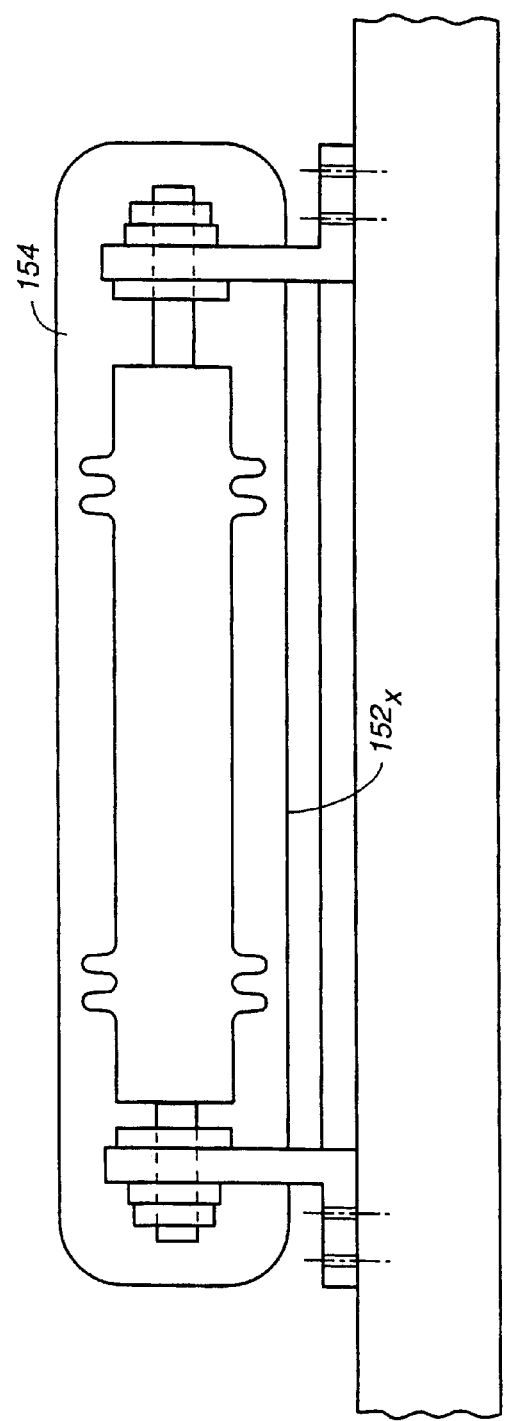
FIG._10

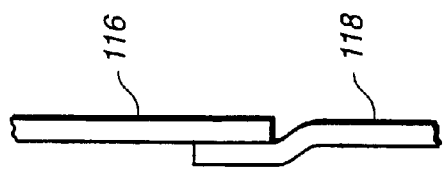
FIG._11A
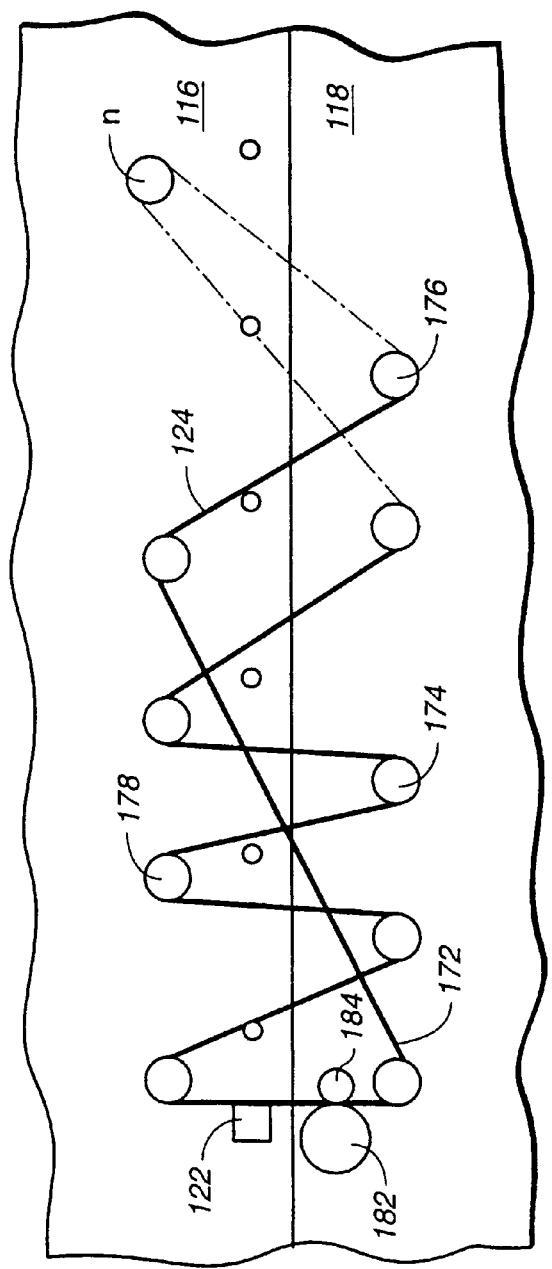
FIG._11

DETECTING FATIGUE FROM MAGNETIC CHARACTERISTICS

TECHNICAL FIELD

The present invention relates generally to the technical field of material testing and, more particularly, to detecting stress, strain, and fatigue in various materials.

BACKGROUND ART

In recent years, resistive changes in detector elements due to elongation and compression were detected by strain gauges, but there was no method for measuring fatigue. However, recently methods have been adopted wherein magnetic changes in structural materials were observed by use of detectors. In such cases, the measuring devices were large-scale and it was difficult to use them in actual job sites. As examples, 1988, *J. Appl. Phys.* 63(8) April 15, D. C. Jiles, Iowa State Univ. and *J. Appl. Phys.* 75(10) May 15, 1994, Z. J. Chen, D. C. Jiles, J. Kamedas' *"Estimation of Fatigue Exposure from Magnetic Coercivity"* cover this subject matter.

As summarized in *J. Appl. Phys.* 75(10) May 15, 1994 paper, magnetic structural steel materials were represented by H∞ ln(N), expressing the relationship between stress cycles (N) and coercivity (H), indicating a fixed linearity existing between the stress cycles (N) and coercivity (H). However, this relationship applies only to structural steel materials and not to magnetic steel materials which are exceedingly corrosion prone. Furthermore, when a magnetic measuring device is attached to the material structure itself, it is the same method that is presently being used for measuring magnetic strain.

Generally speaking, magnetic substances are very hard, brittle and difficult to machine. Furthermore, they are very corrosive and unstable. Since they also become brittle under repeated stress cycling and rupture easily, it is vital that noncorrosive and stable materials be selected. Devices for magnetically detecting stress, strain, and fatigue in various materials must be capable of maintaining stability over at least ten years, and they must be small in size so as to permit easy attachment and detachment.

DISCLOSURE OF INVENTION

Solving the preceding problems in magnetically detecting stress, strain, and fatigue in various materials requires detector elements having the following essential characteristics:

1. Being noncorrosive and stable (over ten years).
2. Having a small, vibration-free, low cost, and low power consuming power system that permits easy attachment of the detector onto the fatigue measuring sample.
3. Having a fatigue-resistant (at least $10^8$) magnetic material.
4. Having a magnetic detecting method that has a high signal-to-noise ("S-N") ratio.

The principal objective of the present invention is to satisfy all of the above requirements simultaneously.

The present invention does not detect changes directly; it attempts to determine such characteristics as material grouping, degree of pressurization, fatigue, etc., of basic materials by magnetically detecting values of coercivity, flux density, magnetic susceptibility, magneto-resistance, impedance, permeability, etc. Furthermore, the earth's magnetic field, temperature, pressure and vibration are maintained as stable as possible. The detector element is made as small as possible so it can be readily attached to the measured specimen. Also, the fatigue element should be structured in its most stable crystalline and amorphous states.

The present invention positions a detector element at a spot where stress is directly encountered and where it can be readily attached and detached from the specimen. As an alternative, a series of detector elements can be distributed across the stress generating body and moved in such a manner as to accurately record on an encoder the positions where the magnetic change causing fatigue are located. At first, the detector elements can be positioned at set spacing and set width so that the magnetic values can be recorded continuously until fatigue occurs. Furthermore, the spacing can be varied to predict changes in fatigue generation.

By utilizing a machinable magnetic substance and form-fitting it into a stress concentrated part of a structural material, it is possible to measure the magnetoresistive effect, Hall effect and impedance of the material. Also, the changes in the resistivity of the structural material from direct strain (frequency) can be detected and its frequency recorded to estimate the fatigue condition of the material. By sealing the entire detector element and detecting means, it is possible to determine the fatigue frequency by measuring the magnetic changes brought about by the direct fatigue cycling in the magnetic specimen. In this manner, it is possible to measure a stable high S-N ratio pertaining to fatigue.

In accordance with the Concentrated Stress Constant, $K=\partial m/\partial n$, in certain applications, the S-N ratio can be improved by utilizing certain types of torsional machining. Furthermore, it is possible to form a concentrated stress specimen subjected to distortional concave pressure, with a detector means attached to the specimen in order to improve the S-N ratio. Some specimens formed under stress can be used by controlling the tension from various angles.

In a similar manner, the stress/strain of even nonmagnetic workpieces can be predicted by measuring the magnetic changes in the tool used as a detector. When the workpiece is magnetic, fatigue can be detected directly with the tool used as a detector element. In some cases, the workpiece itself can be used as a detector element. In this way, the fatigue-resisting capabilities of the tool and workpiece can be determined.

In some cases, it is possible to determine machining accuracy. This is accomplished by measuring the changes in magnetic characteristics of the tool wherein undergoing torque (stress-strain) changes during machining, and the tip of the tool is being subjected to high fatigue stresses. In similar manner, bearings are subjected to high stresses and increased distortion caused by tensile and compressive forces leading to fatigue. Similar fatigue predictions can be made for a thermally stressed oiler and turbine blades.

Detector elements must be able to maintain their characteristics throughout a long period of time. This can be accomplished by subjecting the elements to adequate heat treatment, maintaining the reaction until stabilization is reached, by taking advantage of the supinenodal metamorphosis relationship, and by amorphously forming the elements into wire and ribbon shapes. It is possible to readily detect the characteristics of such wire or ribbon detector elements from changes in their stress-strain crystallization. Furthermore, the detector elements must be fixed sturdily to the material to resist fatigue, such as brazing with a noncorrosive noble alloy.

When short detector elements are used, they are machined to introduce cutting, torsional and tensile stresses into elements, making them stable for mounting on the material specimen. Sensitive detection is possible with such short detector elements since all of the stresses are concentrated. Additionally, bellows and inert gases such as Ar and He are used to isolate the elements from the atmosphere. By doing this, the elements can last from ten to twenty years while maintaining their stable, basic characteristics. It is also possible to enclose the elements in a protective non-corrosive, synthetic, elastic resin body.

If stable detector elements are needed, hard magnetic materials are used. These can be of heat-treated martensitic alloys, dispersed hardened steel, rolled magnets, sintered magnets and others selected at one's option. When corrosion is a concern, using Pt—Fe and Pt—Co type elements are advantageous. Amorphous ferromagnetic materials, and hard and semi-hard materials, such as, Co—V—Cr—Fe types, Fe—Cr—Co wire material, Cu—Ni—Fe types, Fe—Co—Mo wire material, 13Cr stainless steel wire material, piano wire materials, ferrites and others can be used.

Heat treatment processes should conform to this invention. This heat treatment includes magnetic field heating and quenching. To improve corrosion resistance, PVC and PVD treatments are used. In some cases plated layers and enclosures are used to increase the stability of the materials. The size of the detector elements is made as small as possible, and the detector element is mechanically attached to the fatigue specimen by banding, soldering or fusing.

These and other features, objects and advantages will be understood or apparent to those of ordinary skill in the art from the following detailed description of the preferred embodiment as illustrated in the various drawing figures.

BRIEF DESCRIPTION OF DRAWINGS

FIGS. 1A–1D are diagrams illustrating magnetic domain vs. stress vs. magnetic field;

FIG. 2 is a diagram illustrating torsion vs. bending stress vs. tensile strength for a detector element;

FIG. 3 is a diagram illustrating a notched detector element;

FIG. 4 is a diagram illustrating residual stress vs. cycles;

FIG. 5 is a diagram illustrating coercivity vs. cycles caused by material characteristic and shape;

FIG. 6 is a diagram illustrating coercivity vs. crater friction;

FIG. 7 is a diagram illustrating coercivity vs. curvature caused by cut-off cutter;

FIG. 8 is a diagram illustrating impedance change caused by magnetized detector element;

FIG. 9 is a cross-sectional view of a buried, airtight detector;

FIG. 10 is cross-sectional view of a detector system packaged in elastic resin; and FIG. 11 is a fatigue detector for joints in airplanes or ships shown by a cross-sectional view in FIG. 11A.

BEST MODE FOR CARRYING OUT THE INVENTION

Relative to magnetic materials that can be used for detector elements, studies show that ferro-magnetic bodies inherently possess spontaneous magnetism. As depicted in FIG. 1A, the direction of the spontaneous magnetism can change in certain locations with the material exhibiting no magnetism at all. Actually, the crystals of common materials contain flaws such as atomic vacancies and interlattices. When crystals are thermodynamically in equilibrium, the number of atomic vacancies and interlattices is expressed by the following:

$$N = N_0 \exp(-\epsilon/kT) \quad (1)$$

where: $N_0$: Number of places wherein vacancies and interlattices enter
$\epsilon$: Energy for forming defects
$T$: °K.

When a force over and beyond that energy (stress) for forming a fixed defect, i.e. $\epsilon$, is added to a material, the crystals become deformed.

Dislocation is a form of lattice defect. When the crystal becomes deformed from external stress, dislocation of the atoms within the crystalline structure occurs. Furthermore, dislocations tend to vanish during a long term annealing process. The discrepancy in the arrangement of atoms in the core of the dislocation, namely, the stress-strain energy added to the discrepancy energy of the crystals of the atom results in the dislocation energy. Increased dislocations will cause rupture in materials.

The internal magnetic structure of ferromagnets contains structurally sensitive properties. Even within the elastic limits of the material, repeated stress cycling will cause the crystals to sustain the stresses expressed in (1), above, and fail. This type of destruction is called fatigue failure, which is said to be caused by the accumulation and diffusion of vacant latticework, namely the accumulation of dislocations constantly being produced by the repeated stress cycling.

The Shear Unit Strain is expressed as follows:

$$\gamma = nb/d \quad (2)$$

where, d: Average slipping space caused by stress
b: Burgers Vector size
n: Average dislocation number If, l refers to the jog interval that causes vacant lattices; vHz to fatigue frequency; and n to the number of vacant lattices that occur dislocation belt per area, $$\text{then, } n = 2\gamma dv/l \, b^2 K \quad (3)$$

where, $\gamma$: Strain Amplitude
b: Bergers Vector ($3 \times 10^{-8}$)
$1/K$: Helical dislocation rate (0.1) within dislocation slip As an example, $n = 7 \times 10^{14} \text{cm}^2$. Since the number of atoms per unit area is $10^{17}/\text{cm}^2$, the former quantity becomes about 1% of the latter, for which reason fatigue failure occurs.

Usually when ferromagnetic bodies are influenced by a magnetic field, the magnetic direction in the magnetic domains change becoming more susceptible when the magnetic direction faces one direction. For instance, in the case of steel, magnetic domains appear in the six directions out of the simple susceptibility directional <100> surfaces. Within the magnetic domain, not only does one part of the atoms in the ferromagnetic body maintain a set value of mass, m, and (-)valences, but the atoms maintain characteristic dynamic efficiency (spin), and by changing only two nonparallel directions with respect to the outside magnetic field, a dynamic field of atoms is produced.

There is a domain wall between one magnetic domain and the neighboring domain and the wall moves and becomes magnetized. If the length of the magnetic domain is referred to as l, the volume of the domain would be proportional to $l^3$. The energy of the magnetic domains within the magnetic body will always try to become minimized and the magnetic body will become stable as it includes a balance in magnetic domains.

If we let V be the total energy within the magnetic body, $$V = I^2 Sl + \frac{V\sigma}{l} - I^2 V + K \quad (4)$$

where, I: Magnetic strength
S: Surface area of magnetic domain ($l^2$)
V: Volume of magnetic domain ($l^3$)
σ: Surface tensile strength ($KI^2l$:K≈$10^4$ derived from Curie Pt.)
K: Constant If V=constant and S=constant from Equation (4) and let $\frac{\partial V}{\partial l} = 0$ then, $I^2 S - \frac{V\sigma}{l^2} = 0$ and the length l of the magnetic domain becomes, $$l = \frac{\sqrt{\sigma L}}{I} \quad (5)$$

Magnetic domains ultimately direct the magnetic properties of the magnetic body. In order to overcome the domain wall between two magnetic domains, the energies given in Expressions (2) and (3) become necessary. When dislocations occur in materials and the magnetic domain receives strain, dynamic energies are produced and the magnetic characteristics of detector elements change. In the present invention this change is detected by a magnetic element.

In accordance with the present invention, magnetic detection is performed by using magnetoresistive elements, Hall Effect elements or a detection method using direct impedance. If high frequency current, $I_{HP}$, is impressed on a magnetic wire having a radius of a and length of l, in the direct impedance method, the flux, Φ, changes due to the stress oriented magnetic changes. The changes on the surface become very large in the case of high frequency.

If the inductive voltage at both ends of the detector element is referred to as $e_L$, $$\text{then } e_L = \frac{\partial \phi}{\partial t} \quad (6)$$

And if the voltage at both ends of the detector element is referred to as E, $$\text{then, } E = RI_{HF} + \frac{\partial \phi}{\partial t} \quad (7)$$

When E is measured directly, it reflects the magnetic changes in the detector element and ultimately, strain is determined.

The activity within the magnetic domain that is activated by the magnetic field changes greatly with the above-mentioned defects in the crystal structure. The physical amount of change is determined by the changes in chemical structure, impurities, and stress in the chemical composition of the magnetic body. Even with hard and soft magnetic bodies, similar structural sensitivities occur. If a dish-shaped magnetic body is magnetized, the magnetic domain rotates in the direction of magnetization, and the body expands and compresses. If the present form can be equated to a sphere, the distorted shape takes the form of an ellipsoid.

The magnon orientation differs between the nonspontaneous magnetic condition immediately after heat treatment and the spontaneous magnetic occurrence after the aging process, as illustrated graphically in FIG. 1D. Moreover, when an external magnetic field is applied, some materials shrink and others elongate. After machining with either material, the detector element for the fatigue meter can be made at one's option. Permeability changes very sensitively when stress is applied. This is caused by the realignment of the magnetic domains when subjected to magnetization. The stress-strain takes the following form:

$$\epsilon_T = \epsilon_M + \epsilon_C$$

where, $\epsilon_T$: Total strain
$\epsilon_M$: Strain caused by magnetic domain
$\epsilon_C$: Elastic strain Furthermore, the realignment of the magnetic domain is irreversible and the strain can be retained fully and in stable condition.

If tensile stress is applied to a material with positive magnetostriction illustrated in FIG. 1B, magnetostriction will occur slightly even when further magnetized. However, the opposite occurs when compressive stress is applied. Furthermore, in the case of negative magnetostriction also illustrated in FIG. 1B, the opposite occurs. When magnetostriction, λ, is positive, magnetostriction decreases when tensile stress is applied. And when λ is negative, magnetostriction increases when tensile stress is applied.

The above relationship is shown in FIGS. 1C and 1D. Domain walls exist between all magnetic domains, and the magnetic domains move by using the walls as boundaries. The existence of magnetostriction is based on which direction the magnetic domain faces, namely the difference between the spontaneous magnetism of a circular-shaped direction and the spontaneous magnetism of a longitudinal wire direction. Therefore, the value of $e_L$ in Expression (6) changes with respect to the changes brought about by the changing magnetic field.

Ultimately, the benefit deriving from the changes in magnetic characteristics from external pressure depends upon the nature of the magnetic strain detector element. In any event, stress-strain-magnetic changes are always occurring. When a detector element is first magnetized, magnetization decreases as the energy that moves domain walls is added to crystallization (magnetic wall). Magnetization changes proportionally to stress. Also, during magnetic repulsion, magnetization increases when stress causes the domain walls to move.

In metals the crystal shape belongs to one the following: body-centered cube, face-centered cube, and dense cube. Since magnetic bodies are mainly comprised of transitional metal type, they belong to the body-centered cube shape. In order to maintain ample stability, generally oversaturated molten solutions are produced by utilizing the molten heat treatment method. Then, after the molten atoms are distributed uniformly, it is quenched. Finally, after an oversaturated condition is maintained, aging and dispersion treatments are performed to obtain a desired crystal strain. After all this, an additional aging process may be performed in a magnetic field. In some cases, a mechanical strengthening process is used to decrease the crystal size and impose a certain directional orientation in order to obtain the desired mechanical and magnetic qualities.

In order for a localized, concentrated, non-accumulative stress to be added with respect to detector element 20 having a diameter, d, a configuration is adopted wherein torsional and bending stresses are impressed as shown in FIG. 2.

When tensile force is applied, the following expression results, with P representing the tensile axial load, and W, the tensile stress.

$$W = P \sin \alpha$$

If Shearing Force is represented by F, then $$F = P \cos \alpha$$

If Torsional Moment is represented by T, then $$T = PR \cos \alpha$$

If Bending Moment is represented by M, then $$M = PR \sin \alpha$$

If the Average Shearing Force is represented by $\tau$, then $$\tau = \frac{16 PR \cos \alpha}{\pi r^3}$$

And the Maximum Shearing Force becomes, $$\tau_{MAX} = \frac{16 WR \cos \alpha}{\pi r^3}\left(1 + \frac{d}{4R}\right) \quad (8)$$

And the Torsional Stress becomes, $$\delta_M = \frac{16 R}{\pi d^3} P \cos \alpha \quad (9)$$

Therefore, fatigue can be determined from these expressions. (Refer to FIG. 2) It also indicates how fatigue can develop when torsion is the minimal added stress. Expression (9) can be effectively utilized to its fullest.

When stress is applied to a crystal body or an amorphous body, stress will be concentrated in and around the circumference of the dislocation and the parallelism of the spin around the dislocation becomes disturbed. Taking Fe into account, the energy at the domain wall is generally about $10^{-3}$ J/m$^2$ and the crack propagation energy is 1 J/m$^2$. From the exchange reaction caused by the strain force at the domain wall, the magnetic characteristics will change with a minute addition of energy.

During the reduction process of high density alloys, the phenomenon of mutual separation causes the free energy to increase by the fluctuation of density as depicted in the downward facing convex curve. An upward facing convex curve depicts a decrease in free energy wherein the reduction process becomes stable, and with time the convex curve shows density to be constant. In this manner, supinenodal reduction is made to occur and stabilizing change is accomplished by advancing the synergistic effect. Therefore, at first the short wave length fluctuating wave grows and in time it becomes a long wave length wave, and the molten solution becomes a quasi-stable compositional phase. Ultimately, the curvatures of the free energy and compositional density curves provide the finding.

It is important to think that residual stress is virtually nonexistent when fatigue occurs; in other words, fatigue has virtually no relationship to stress. This relationship is shown in FIG. 4 for carbon steel. Moreover, you can not predict what the fatigue may be even thought it is possible to measure the residual stress.

Generally when iron based materials are machined, a minimum of 10 cal/mm$^3$ (approx. 10,000 cal/mm$^3$) of energy is generated at the tool tip or the workpiece itself, and the tool tip and the tool holder experiences high temperatures and stresses. When a magnetic material is interposed, it is possible to predict what the tool tip life would be by the magnetic changes that are brought about. Also, it is possible to predict tool life prior to and during machining by magnetically detecting the tool tip angle and radius. Therefore, it is possible to demagnetize the tool prior to machining or magnetize and then begin machining. The tip of the cutting tool experiences high temperatures over 500° C. and high pressures of 50 to 100 kgf/mm$^2$.

An example of a notched tool is shown in FIG. 3. If the failure stress of a smooth material is designated by $\delta$, the developed stress takes on a parabolic form. Furthermore, concentrated stress develops at the bottom of the notch resulting in a sliding surface, and the stress further brings about a crack failure. The relationship between the output voltage of the magnetic detector, $V_H$ and the strain cycling frequency can be described as follows:

$$V_H = K \ln (N)$$

In this instance, the constant K represents the notch and the value of K decreases due to the notch.

In amorphous magnetic alloy groupings there are the iron alloys, such as $Fe_{80}P_{20}$, $Fe_{80}B_{20}$, $Fe_{78}B_{10}Si_{12}$, $Fe_{62}Cr_{12}Mo_8C_{18}$, etc.; the cobalt alloys, such as $Co_{80}Zr_{20}$, $Co_{78}Si_{15}B_{12}$, $Co_{44}Mo_{36}C_{20}$, $Co_{34}Cr_{28}Mo_{20}C_{18}$, etc.; the Ni alloys, such as $Ni_{90}Zr_{10}$, $Ni_{34}Cr_{24}Mo_{24}C_{18}$; and there are other alloys, such as $Pd_{80}Si_{20}$, $Ti_{50}Cu_{50}$. All of their tensile strengths are in the range of 400 kgf/mm$^2$ to 140 kgf/mm$^2$. In the case of $Pd_{80}Si_{40}$, the fatigue life was $10^8$ cycles when the tensile strength was 32 kgf/mm$^2$. The relationship between the size of the plastic fatigue region, P, and the stress magnifying constant, K, is as follows:

$$P \propto K^n$$

In this case, n≈2. In the case of an amorphous material, it is extremely stable, very homogenous structurally and has superior plasticity. It is an effective material. Generally up to now, there is little relationship between fatigue and residual stress.

INDUSTRIAL APPLICABILITY

WORKING EXAMPLE 1

Using a PtCo 50—50% magnet, subjecting it to a 5-stage hot wire drawing and pressure reduction rate of 50%~22% after wire drawing, it was made into a 0.45 mm diameter rectilinear material. A fatigue test was performed on a cantilevered end at the rate of 1,500 cycles/min. The overhang length was 22 mm and the tip had an amplitude of 1 mm. A Hall element was attached to the fixed end. In this case, the maximum bending stress was 30.4 kg/mm$^2$. The bending stress of the base material was 142 kg/mm$^2$, and at a yield of 0.2%, the stress was 139 kg/mm$^2$. Consequently, the test was run at 0.22% load (Refer to A, B in FIG. 5). At $10^7$ cycles, the beginning coercivity of 6.2 Oe dropped to 0.5 Oe. The coercivity dropped to less than 10%, indicating fatigue was advanced. The equation in FIG. 2 was used for the graph FIG. 5 (B). The use of 13Cr stainless steel material is shown in FIG. 5(C).

WORKING EXAMPLE 2

Using the same parameters, after $10^7$ cycles the beginning coercivity of 0.06 Oe increased approximately 8 times to 0.50 Oe. This is shown in FIG. 5(A).

WORKING EXAMPLE 3

Using the same PtCo magnetic material, a loop was formed to 1R. The angle α in FIG. 2 was 45°, R=12.5 mm, and d=0.45 mm. The test was performed with tensile force, P=40 g., 300 $H_z$ magnetostrictive material. A torsional stress of 12.2 kg/mm² was imposed. This test resulted in approximately 1/10 the load, but comparing with complete fatigue data, it showed that the beginning coercivity of 8 Oe became 10 Oe after $10^7$ strain cycles.

WORKING EXAMPLE 4

After heat treatment of a 0.45 mm diameter Cr 13%, Mn 1% material, it was tempered to a hardness $H_v$500. The strain cycling was 1,500 cycles/minute and the mechanical strength was 98 kgf/mm². The test was performed at 9.5 kgf/mm² load, based on 98 kgf/mm² load at 0.2% yield. The results are shown in FIG. 5(C).

WORKING EXAMPLE 5

Using a FeCr 28%, Co 15%, Mo 3% material, wire drawing down to 0.96 mm diameter, heat reduction treatment from 610° down to 500° C. at a rate of 4°/hr, after subjecting 200 mm long open terminal to $10^8$ cycles, the coercivity decreased to 15 Oe from 250 Oe. The applied stress was 9.6 kgf/mm². Full advantage was taken of the complete supinenodal metamorphosis that had taken place. At $10^8$ cycles, the open magnetic field of 24.5 Oe became 12 Oe.

WORKING EXAMPLE 6

Using 14% WC+TiCTi+10% Co sintered to a 65 kgf/mm² stainless steel material, with cutting tool parameters: side relief angle 12°, land and top relief angles 0°, front and side angles 10°, cutting speed 110 m/min; machining was performed using a mineral cutting oil at the rate of 10 l/min. The result is shown in FIG. 6(B). The result under dry machining is shown in FIG. 6(A). Namely, the cutting tool tip was subjected to high strain forces. Demagnetized measurements were taken with respect to Co. When magnetized, the machined chips were affected and measurement was difficult. However, a trend was determined. Consequently, a stable machining accuracy with respect to the machined material can be insured if on-line measurements are taken.

WORKING EXAMPLE 7

Using an electroplated ID cutter (natural diamond 800#, concentration 100) on a base material of 13Cr stainless steel material, measurements were taken on a magnetized cutter, graph (A) in FIG. 7, and non-magnetized cutter, graph (A') in FIG. 7. The workpiece material was a $Al_2O_3SiN_2$ ceramic material. With respect to the machining time and parallelism accuracy of the workpiece, the magnetized results are shown in A, and the non-magnetized results in A' in FIG. 7. In both cases the machining speed was 55 m/s and kerosene was used as a cutting oil. The result showed that cutting life can be predicted.

WORKING EXAMPLE 8

Using a 1.3 mm diameter reamer, a carious bone was machined at the speed of 4 to 5 rpm. The bent tool material was 13 Cr stainless steel, having a hardness of Hv 500. While machining at 45R and non magnetized, just prior to the reamer breaking the magnetic field Oe strength was three times that of the starting Oe. Even in other medical tool applications, it is possible to predict tool failures quite readily. It was learned that this can be applied to manufacture of hypodermic needles, grinding tools (including diamond), saws, chisels, cutters and etc.

WORKING EXAMPLE 9

After HF hot forging Cr 29%, Co 15%, Mo 3% by weight, Fe material in Ar atmosphere, and heat treating from 600° to 450° C. at the rate of 8° C./hour, a NdBFe magnet (48MGO) 2 mm thick was magnetized NS and placed 5 mm in the vicinity of the midpoint of the forged material. The voltage waveform of this material was compared when a 2.5 MHz damping wave was impressed during the demagnetized state. As indicated in FIG. 8, it is possible to detect impedance when magnetized. Also in the condition when the magnetic detector material is induced by a strong Psin α, it is possible to detect the resistivity by comparing wire length and elongation, Δl/l, of the magnetized material in measuring the fatigue and strain simultaneously. In this case it is necessary to insulate the connecting point of the magnetized material and the force terminal. By using ceramics, it can be bonded mechanically by applying surface pressure.

WORKING EXAMPLE 10

In testing imbedded structures, it is possible to imbed with the detector elements wrapped in stable plastics or in an inert gas environment to make them airtight, and bond the elements to the structures. A plastic case with filler materials can also be used. An example of such an element is shown in FIG. 9.

FIG. 9 depicts a magnetic body 30, consisting of an element that is being magnetically detected, and a highly sensitive central part 32 that senses torsional fatigue, which is bonded to a Hall element flux meter 34. The fatigue sensing central part 32 is fixed with elastic synthetic resin 36. Fatigue transmitting bars 42 and 44 are made of corrosion resistant materials, from the stainless, noble metal or Ti group. External connecting bars 46 and 46' are secured/coupled directly to the fatigue-inducing material. Joint 48 is fastened with screws and then soldered. An airtight terminal 52, or an induction coil is used to get the signal out. Also, an interrupted signal can be supplied externally.

The apparatus depicted in FIG. 9 is further explained as follows: (A) is a battery power supply 54 using a long-life battery like Lithium. The signal is integrated and processed by a sensing means 56 that includes a microcomputer. A main body 62 is carried by supports 64 and 66, and is sealed by elastic rubber plugs 72 and 74. Moveable bellows 76 and 78 are constructed using corrosion resistant materials. Inert gases are introduced through a sealed port 82. Joints 92, 94, 96, 98, 102, 104, 106 and 108 are sealed with platinum alloy or gold solder. After mechanically connecting the bars 46 and 46' to the fatigue source, the entire system is either embedded in concrete, or placed in a corrosion-free environment. By use of the sensing means 56, the complete power supply is activated by the signals received from the outside, and the resulting signal from the flux meter 34 is supplied to the outside. It is simple to supply a cycling induced fatigue value to the outside as a signal. Temperature and other drift can be eliminated and a stable output can be derived for a required life of ten years.

WORKING EXAMPLE 11

Wire (ribbon) magnetic materials may be used advantageously in ships, airplanes, structures, buildings and large-sized objects as illustrated in FIG. 11. The components 112, 114, 116, 118, and rivet component 122, with respect to the fatigue receiving component 116, are traversed by a magnetic wire material 124 threaded around a capstan 126 and guide 128, and move the magnetic wire 124 over a measurement discriminating head 132 to detect the magnetic field. The fatigue value is detected in this type of large-scale setup. A fixed spacing is magnetized and the pitch is read. The portion that receives the strongest stress is detected. Fixed elements 134, 136 and 138 are regularly anchored by using ceramic resin and when measurements are taken the fixed elements are loosened to permit movement and subsequent readings. Measurements can also be made by arranging in series a plurality of the single unit depicted in FIG. 10.

WORKING EXAMPLE 12

At one end of an amorphous magnetic material, $Pd_{80}Si_{20}$, having thickness $20\mu$, width 15 mm, length 20 cm, was bonded to a permanent magnet, $PrCo_3$, diameter 0.3 mm and length 2 mm, 9 kg8KO$_c$, with epoxy resin. When 800 Hz tensile stress and 45 Kgf/mm$^2$ tensile force in cycling stress was impressed on the bonded material, its life was $8 \times 10^6$ cycles.

WORKING EXAMPLE 13

When setting the detector in FIG. 10, the stator must be set with respect to the measured specimen. A screw is adjusted to set the tensile force between the detector and the structure. A measurement setting bar is inserted on the side of a stress determining bar 152 of the detector shown in FIG. 10. After fixing both ends with screws, the setting bar is removed. The length of the setting bar is made so that strong and weak stress changes can be recorded. When the measured specimen is made up of an iron material X, the specimen can be fixed in place with screws. In this case, an elastic synthetic resin cover 154 is used. Even if the entire case is imbedded in concrete, the stress on the measured specimen and X can be transmitted to the detector without affecting the detector element.

WORKING EXAMPLE 14

FIG. 11 depicts a long detector element 172, that is used for transportation applications other than those shown in FIG. 9. Such element 172 is commonly fixed to a pulley arrangement. Pulleys 174, 176, 178 ... (n) guide the detector element 172. The fatigue measurement is read by an encoder fixed to capstan 182 and pressure guide 184. The pulleys 174, 176, 178 ... (n) are loosened to allow the detector element 172 to move into prescribed positions for fatigue measurement to be taken by the detecting means in capstan 182. In this setup, the pulleys 174, 176, 178 ... (n) play the role of a chuck. Normally the magnetic detector element is held in a fixed position, but in the example depicted in FIG. 11 the detection element is permitted to move when taking fatigue measurements.

Although previously there were inadequacies in measuring fatigue, the present invention makes possible the prediction of fatigue for an exceptionally wide-range of applications. Accordingly the invention has been described in terms of the presently preferred embodiments. It is to be understood that such disclosure is purely illustrative and is not to be interpreted as limiting. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A method for assessing fatigue in a basic material being subjected to external stresses and strain using a magnetically permeable detector element, said method comprising the steps of:

attaching at least a portion of said detector element to any basic material while the basic material and said detector element are subjected to external stress or strain; and for assessing fatigue in said basic material, analyzing, using a digital computer, changes in magnetic characteristics of said detector element due to internal change in magnetic domain and crystal deformation thereof caused by said external stress or strain.

2. The method for detecting fatigue in any basic material of claim 1 wherein the sensing means measures changes in electrical resistivity of the detector element.

3. The method for detecting fatigue in any basic material of claim 1 wherein the sensing means is connected at a location selected from a group consisting of an end face or a portion of an end face of the detector element to facilitate detecting changes in magnetic characteristics of said detector element.

4. The method for detecting fatigue in any basic material of claim 3 wherein the detector element is encapsulated, and wherein the detector element includes a coupling means selected from a group consisting of an external terminal or an inductive transmitter for coupling the sensing means to the detector element.

5. The method for detecting fatigue in any basic material of claim 1 wherein the detector element has a form selected from a group consisting of a wire or a tape, and the detector element is moveable across the sensing means when measuring changes in magnetic characteristics of the detector element.

6. The method for detecting fatigue in any basic material of claim 1 wherein the detector element is secured in a location selected from a group consisting of a hill, wall, precipice, embankment, building, support, piling or earth beneath a road for measuring changes in magnetic characteristics of the detector element at a prescribed place.

7. The method for detecting fatigue in any basic material of claim 1 wherein the sensing means measures changes in impedance of the detector element.

8. A method for detecting fatigue in a magnetically permeable machining workpiece being subjected to external stresses and strain, said method comprising:

positioning adjacent to the machining workpiece a movable magnetic sensing means adapted for magnetically scanning the machining contour of the machining workpiece; and for assessing fatigue in the machining workpiece, analyzing, using a digital computer, changes in magnetic characteristics of the machining workpiece due to domain and crystal deformation thereof caused by said external stress or strain.

9. The method of claim 1, 2, 3, 4, 5, 6, or 7 further comprising the step of including a microcomputer in the sensing means.

10. A machine-tool fatigue detections apparatus comprising:

a magnetically permeable machining tool adapted for being moved during machining of a workpiece, which movement during machining subjects said tool to external stressing and strain, before commencing machining said tool being conditioned magnetically for detecting fatigue; and sensing means adapted for and positioned for measuring changes in magnetic characteristics of the moving tool whereby tool fatigue is evaluated from measured changes in tool magnetization.

11. The apparatus of claim 10 wherein the sensing means includes a microcomputer.

12. The apparatus of claim 10 wherein magnetically conditioning the magnetically permeable moving tool includes demagnetization thereof.

13. The apparatus of claim 10 wherein magnetically conditioning the magnetically permeable moving tool includes magnetization thereof.

* * * * *